United States Patent [19]

Villard

[11] Patent Number: 4,845,916

[45] Date of Patent: Jul. 11, 1989

[54] ASSEMBLIES OF PLURAL INTERFITTING MEMBERS

[76] Inventor: Gerard Villard, Les Communaux, 44360 St Etienne de Montluc, France

[21] Appl. No.: 931,731

[22] Filed: Nov. 17, 1986

[30] Foreign Application Priority Data

Apr. 18, 1986 [FR] France ................................ 86 05637

[51] Int. Cl.⁴ ............................................. E04C 2/34
[52] U.S. Cl. ........................................ 52/802; 40/209;
52/731; 403/363; 428/33
[58] Field of Search .................................... 428/33–53;
40/209, 564, 570, 574, 604, 605; 52/802, 731;
403/246, 363

[56] References Cited

U.S. PATENT DOCUMENTS

| | | | |
|---|---|---|---|
| 83,226 | 10/1868 | Walters et al. | 52/731 |
| 686,817 | 11/1901 | MacPhail | 52/731 X |
| 1,923,522 | 8/1933 | Whitehouse | 428/15 X |
| 1,944,726 | 1/1934 | Aiken | 62/293 |
| 3,095,943 | 7/1963 | Kemp | 428/118 X |
| 3,450,593 | 6/1969 | Fossier et al. | 428/116 X |
| 4,050,212 | 9/1977 | Gantke et al. | 52/731 X |
| 4,314,417 | 2/1982 | Cain | 40/209 |
| 4,516,874 | 5/1985 | Yang | 403/363 X |
| 4,649,679 | 3/1987 | Arens | 428/53 X |
| 4,709,525 | 12/1988 | Adell | 428/31 X |
| 4,722,629 | 2/1988 | Makita | 403/363 X |
| 4,760,682 | 8/1988 | King | 52/731 |

FOREIGN PATENT DOCUMENTS

| | | | |
|---|---|---|---|
| 867359 | 9/1978 | Belgium | 428/75 |
| 2054366 | 2/1981 | United Kingdom | 52/731 |
| 2150727 | 7/1985 | United Kingdom | 40/209 |

Primary Examiner—Henry F. Epstein
Attorney, Agent, or Firm—Cooper & Dunham

[57] ABSTRACT

Structure comprising an assembly of interfitting members including a plate member having a border section on at least one part of its periphery, fitted over a complementary resiliently deformable relief section borne by a second member by temporary elastic warping of at least one of the members. The relief section projects from a ridge engaged by the edge of the border section and has a height, in unstressed condition, which is greater than the distance separating the second member and the plate member in the assembled structure, so that the relief section bears against the plate member in the assembled structure.

19 Claims, 4 Drawing Sheets

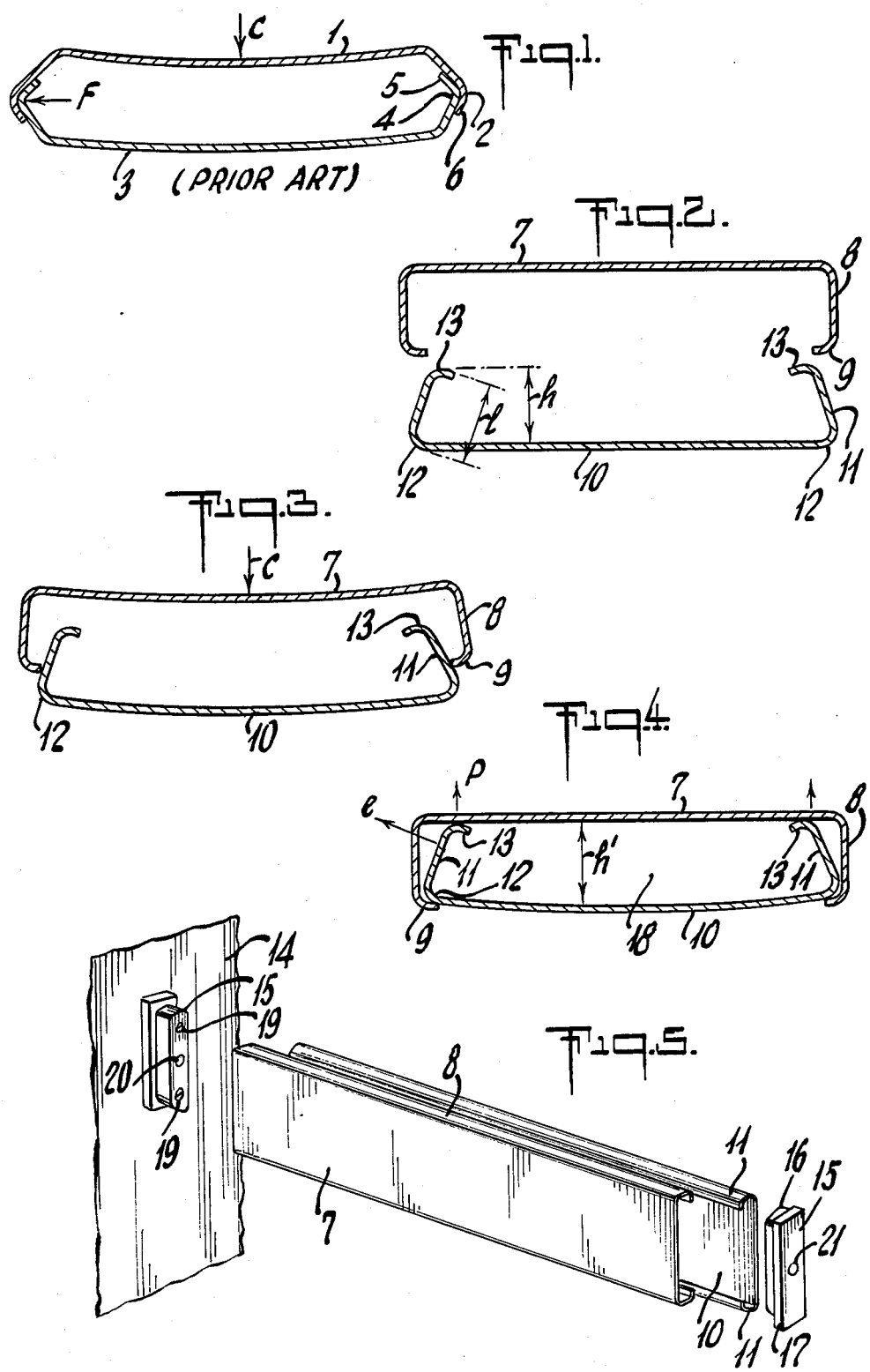

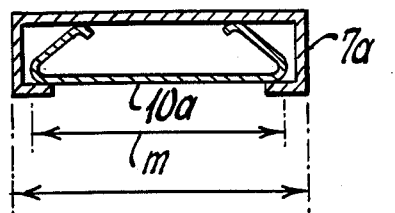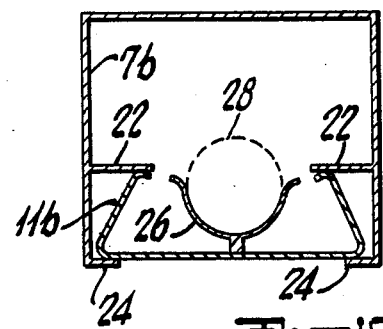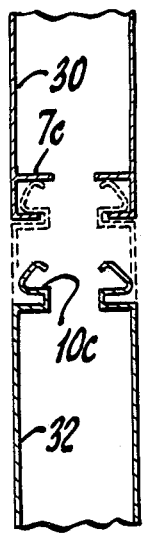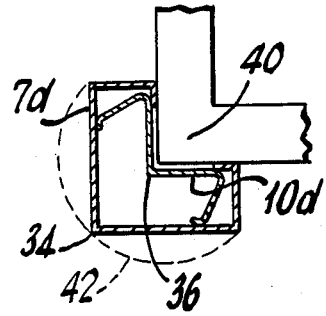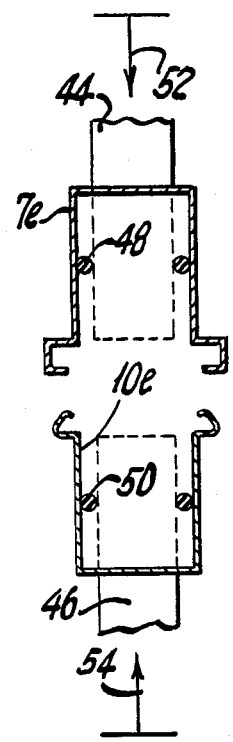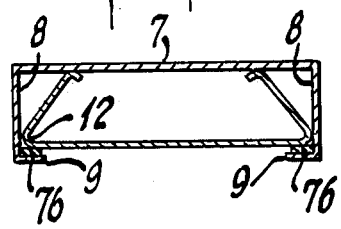

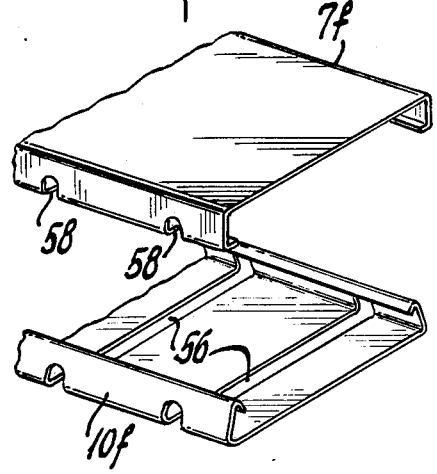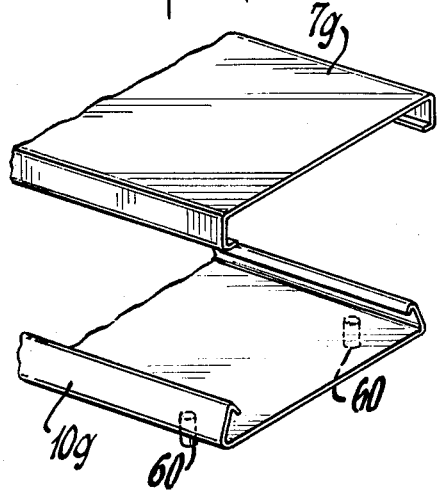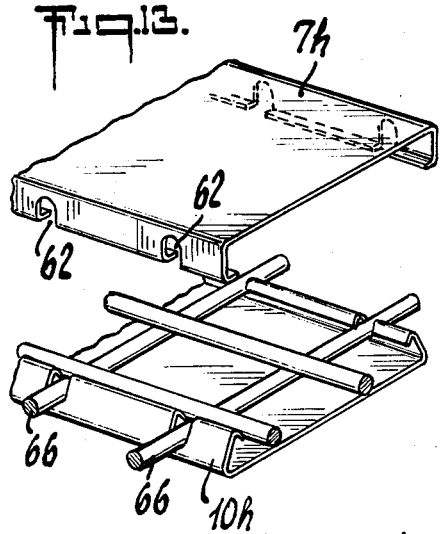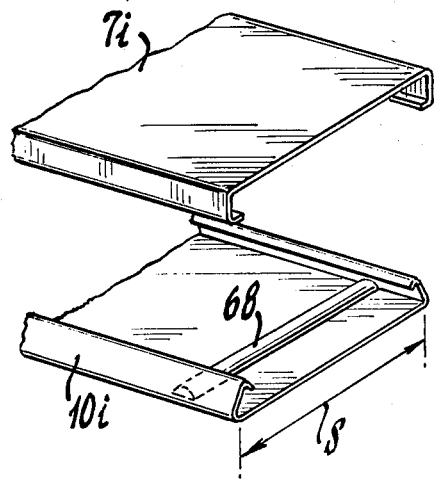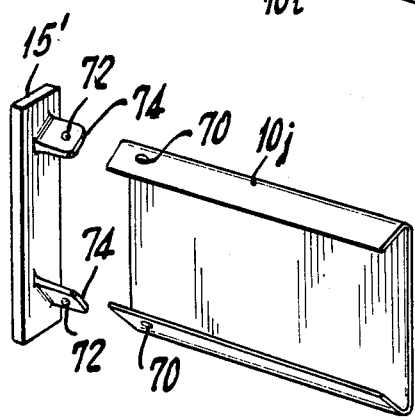

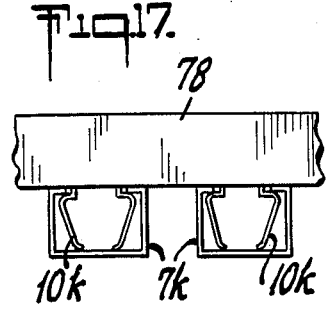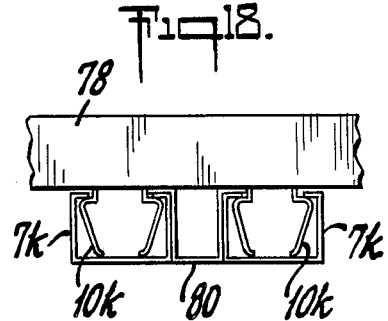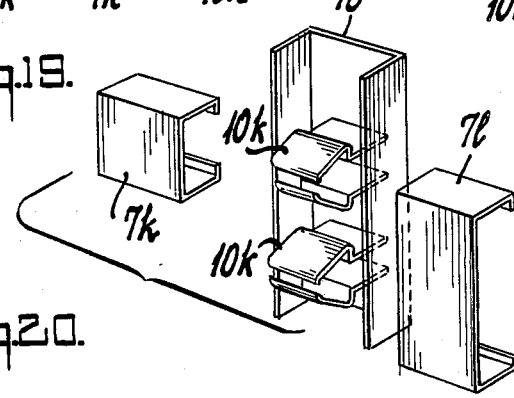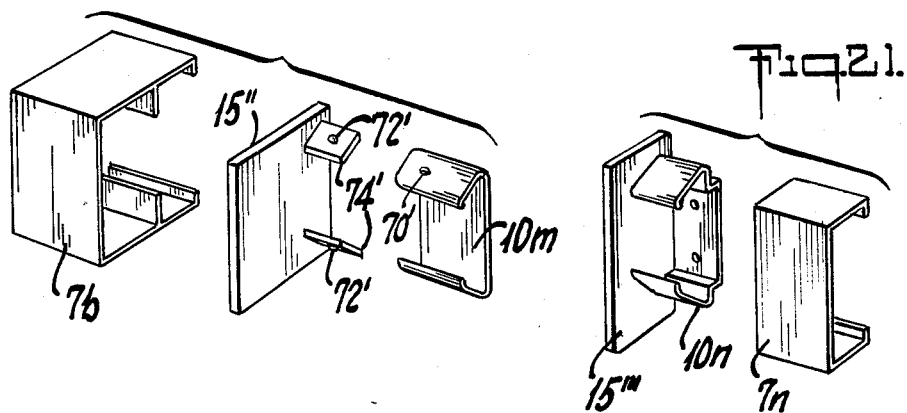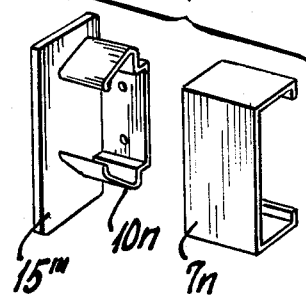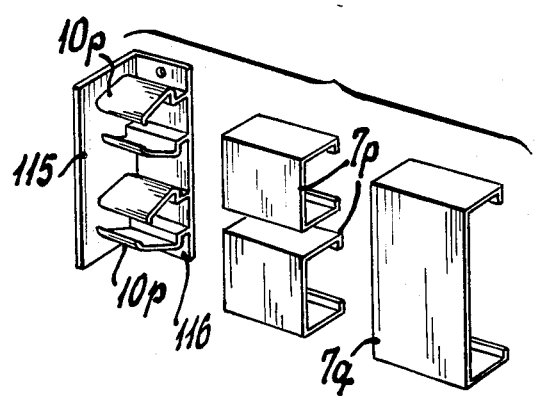

ASSEMBLIES OF PLURAL INTERFITTING MEMBERS

BACKGROUND OF THE INVENTION

This invention relates to structures or elements comprising assemblies of plural interfitting members, wherein the interconnection of the constituent members is effected by resilient deformation of at least a portion of one or more of the members. In an important specific sense, the invention is directed to structures comprising a flat thin plate (first member) attached to a support, by fitting a relief section which borders that plate, on at least one part of its periphery, into a complementary relief section borne by a second member, via a temporary "elastic warping" (resilient deformation) of at least one of the two members in the assembly. This attachment is herein sometimes termed a "clipping attachment."

One illustrative use of such structures is as rigid, self-sustaining signs. For example, two thin-walled, shallow, resiliently deformable channel members of metal or plastic may be interfitted in facing parallel relation to each other (with the side flanges or legs of one channel member inserted between the side flanges of the other) to constitute a hollow, rigid element capable of being mounted to serve as a sign, with the letters and/or other characters of the sign applied to the exposed central web surface or surfaces of one or both of the channel members.

In order to get a tight clipping attachment and in particular to ensure that the two assembled members are not likely to glide lengthwise relative to each other in the assembled structure, it is necessary that, after assembly, at least one of the members retains some elastic warping which will create a securing force for the two interfitted members. Actually, the inside or male member, i.e., the one whose projecting side flanges or border sections ("clipping sections"), in relation to the surface of that member, are pushed towards the center, is submitted to a flexing couple which tends to create a convex warping, pushing the center of the male member backwards and outwards to the side opposite where the clipping sections project, whereas the other element is subjected to a concave warping, in relation to the side opposite where its clipping sections project. Considering the channel formed by a plate or channel member and on both its side edges by the projecting clipping sections, the channel of the male member tends to be closed back and the channel of the female member, fitting from the top, tends to be open. Thus, if the members bordered by the clipping sections are thin plates which, consequently, offer little resistance to flexion, these plates will, after clipping attachment, show a concave or convex warping of their outside surface i.e. the surface not facing the other plate. In known structures of the described type, this warping is all the more noticeable owing to the fact that the interlocking ridge where the clipping sections of the members clip is spaced from the plate's plane; that is to say, the clipped whole will have a bigger apparent volume.

This warping, even if it is slight, is prejudicial to the nice appearance of the plate surface, especially under oblique lighting.

Apart from this inconvenience, however, the clipping attachment of interfitted members presents several assets which mainly lie in the fact that when they are of adequate type, the clipping sections can be detached and, as far as appearance is concerned, absolutely no attaching device is visible. These two assets are particularly appreciated when dealing with sign posting likely to be periodically changed, e.g. tables bearing the names of people living in apartment houses, directional signs on show grounds, signs bearing the name and position of people in public offices, signs or billboards in advertising or in shops to show prices, or in purely aesthetic devices which involve different color boards that can be moved around as one wishes.

In these different examples, the plates (members) building up the visible surface, or front plates, must be light and thin. When they are fixed on their support by clipping, their folded edges on the clipping sections along a thin plate forming the complementary member, or when they are fixed on single clips occupying only parts of the front plate, they are likely to show the undesirable warping described above.

SUMMARY OF THE INVENTION

An object of the present invention is to overcome the foregoing difficulties caused by clipping sectional edges jutting out at the back of a front plate member on elastically warpable sections, in a structure comprising an assembly of at least two interfitting members wherein at least one has a resiliently deformable clipping section. For convenience, reference will be made to the interfitting of two members, one of which will be referred to as the front plate member, first member, or female member, and the other of which will be referred to as the complementary member, second member, or male member.

To the foregoing and other ends, the present invention in a particular aspect contemplates the provision of a structure comprising interfitted members characterized by the fact that these elastic warpable clipping sections (of a male member) outside which the sectional edges (clipping sections) of the front plate (female member) are fitted, do, in relation to the interlocking or hitching ridge of the sectional edges on the complementary male member, reveal an available space, widthwise, which is elastically articulated to this ridge and is bigger than the distance separating, on one hand, the generator of the sectional edge from the thin plate working together with the hitching ridge and, on the other hand, the inner surface of the front plate.

Given this disposition, after clipping attachment, the end of the free part which is elastically articulated to the hitching ridge will exert a reaction on the thin front plate already clipped and near its clipped edge. This reaction does not create a flexing couple in the sectional edge (edge of the female-member clipping section) ending on the hitching ridge, anymore, but a tension in the thin plate by causing the latter sectional edge to be an elastic support against the rear surface of the hitching ridge, following a direction perpendicular to the thin plate.

The thin front plate (female member web) remains perfectly flat after having been clipped, according to the system complying with the invention, in an astonishing way. There is no play in the fitting and the supporting force is nevertheless powerful enough to prevent any sliding, by rubbing, of the front plate on the complementary (male) member following the direction of the hitching ridge.

According to another characteristic and in the eventuality of wide sectional clipping edges, the central part of the front plate member and/or of the complementary member can be made more rigid than the parts close to the clipping sections by increasing the thickness and/or by use of rigid elements such as small plates or braces fixed on that central part, etc.

According to another characteristic and to make the front plate member interdependent with the complementary member in an unmovable way, especially in the case of the clipping of a front plate member with parallel sectional clipping edges forming a channel, a wedge going against the inward elastic warping of the free parts of the clipping sections on the complementary member is introduced after the clipping attachment between, at least, the two opposite free parts.

When the complementary member has itself a channel section in order to form, with the front plate member, a flat tubular piece, two wedges are inserted in the extremities of the warped part of the complementary member, or a stiffener, either rigid or elastically compressible, occupying a more or less big part along the member may be introduced in the complementary member sectional deformed channel.

These wedges have, for example, a corner core penetrating the channel of the complementary member and, on the rear side of this core, a peripheral edge that cooperates with the edge of the front plate to form a cover. They can be, as well, made of a small plate bearing elastic or resilient sheets, that can be inserted in the extremities of the assembled front plate and complementary element. These elastic sheets can be clipped on at least one of the assembled members.

The two wedges, at the opposite extremities, can be connected by a brace to prevent the wedges from being torn away by hand.

When the unit constituted by the complementary member and the front plate is to be put on a support, the interdependence with the support can be achieved thanks to the complementary member, especially when it is not visible. The complementary member can be screwed, glued or fixed on the support by any other means. The support can be a wall, either vertical, horizontal or oblique railings, or may comprise double orientated railings that are hinged at their meeting points or following a single direction, but that are interdependent with the complementary member in a revolving way. The complementary member can be fixed as well on poles or on horizontal bars with a bracket or with tongs. Two complementary members can be attached back to back on one support.

When the back of the complementary member is visible, the plate making up this complementary member becomes a front plate, for example for signboards that can be read from both sides perpendicular to the supporting wall, and the interdependence with the support can then be achieved thanks to one of the wedges at the extremities, in the case of a perpendicular attachment to a wall or thanks to both wedges at the extremities, in the case of attachment on a socket. The socket can also be made of long elements each one being hinged on a vertical axis to one of the sectional edges of the front plate. To be put aside, these elements can be placed in the plane of the assembled members or can be slightly perpendicular to it in order to maintain the front plate in a vertical position.

It is to be noticed that, in the case of attachment on a wall partition, the front plate itself which is normally personalized and the front plate made of the complementary member (especially when this one is personalized as well and thus, has to be shifted around together with the front plate) can be removed as a whole from the wedge which is interdependent itself with the wall, in order to be attached elsewhere afterwards to another wedge.

The front plates complying with the invention can be painted, engraved, punched and done in all kinds of materials such as light alloys, translucent, transparent or opaque plastic materials, etc. Because of the lack of attraction from a fixing couple, after the clipping, the flat tubular element constituted by the front plate and the complementary member can be wide enough to house a neon tube with a translucent or transparent front plate. A plastic gasket can be boxed in between the sectional edges of the two members when the clipping is being done.

In ordinary usages, the front plate is long and rectangular with parallel clipping sections on both sides and the complementary member is a channel of equal length or of a length corresponding to a part of the front plate length. The clipping sections can, nonetheless, be arranged as a triangle, a rectangle or on a more general model as any geometric figure.

Further features and advantages of the invention will be apparent from the detailed description hereinafter set forth, together with the accompanying drawings.

BRIEF DESCRIPTION OF THE DRAWINGS

FIG. 1 is a cross-sectional view of a prior art assembly of resiliently deformable channel-shaped panels;

FIG. 2 is a cross-sectional view, prior to assembly, of a pair of resiliently deformable channel-shaped elements that are interconnectable to provide a structure embodying the present invention in a particular form;

FIG. 3 is a similar view of the elements of FIG. 2 at an intermediate stage of assembly;

FIG. 4 is a similar view of the structure constituted of the elements of FIG. 2 after assembly is complete;

FIG. 5 is an exploded perspective view of a signboard in accordance with the invention fixed on a partition wall and incorporating the structure of FIG. 4;

FIG. 6 is a schematic cross-sectional view of another embodiment of the invention;

FIG. 7 is a schematic cross-sectional view of a further embodiment of the invention;

FIG. 8 is an exploded schematic sectional view of yet another embodiment of the invention;

FIG. 9 is a schematic sectional view of an additional embodiment of the invention;

FIG. 10 is an exploded schematic sectional view of a still further embodiment of the invention;

FIGS. 11, 12, 13 and 14 are fragmentary exploded schematic perspective views of further modified embodiments of the invention;

FIG. 15 is a fragmentary exploded perspective view of an additional feature of the invention, in a particular embodiment;

FIG. 16 is a schematic cross-sectional view showing an embodiment of the invention generally similar to that of FIGS. 2-5 but incorporating a gasket;

FIG. 17 is a fragmentary schematic sectional view of still another embodiment of the invention;

FIG. 18 is a similar view of the same embodiment, illustrating the inclusion of an auxiliary element therein;

FIG. 19 is a fragmentary exploded perspective view of the embodiment of FIG. 17, illustrating alternative male members usable therein;

FIG. 20 is a fragmentary exploded perspective view of a modified form of the embodiment of FIG. 7;

FIG. 21 is a similar view of a still further embodiment of the invention; and

FIG. 22 is a like view of a modified form of the embodiment of FIG. 21, also illustrating alternative male members usable therein.

DETAILED DESCRIPTION

The invention will initially be described as embodied in a structure comprising two facing, parallel, resiliently deformable channel members interengaged along their sides to constitute a rigid hollow assembly. By way of example, the channel members may be roll-formed sheet metal (e.g. aluminum or steel) members or molded plastic members, each having a thin, resiliently flexible flat central web and appropriately shaped side legs or flanges. One of the two members (the male member) is received within the other (the female member); the cross-sectional dimensions of the members are mutually selected so that the side legs or flanges of the female member are clipped or snap fitted over the side legs of the male members, and, as thus assembled, the male and female members are respectively stressed in compression and in tension, being thereby held securely together.

A commercially important use of such a structure (to which, however, the invention in its broader aspects is not limited) is as a self-sustaining sign element, e.g. projecting from an upright support, or extending between two uprights, or mounted flat on a surface, etc. For these purposes, each of the constituent channel members is relatively broad and shallow in cross-section. The letters and/or other characters of the sign are applied to the exposed outer surface or surfaces of one or both of the channel member webs.

FIG. 1 illustrates an exemplary prior art structure of the foregoing type. In this figure, the front plate or female channel member 1 which clips to the complementary (male) channel member 3 by the outside is a thin sheet made of a light alloy, for example, and has side legs or flanges folded back in order to form a hitching dihedron 2. The complementary male member 3 is made up as well of a thin web whose side legs are folded back to form a dihedron or hitching ridge 4. The legs of the male member are extended further (as shown at 5) than the ridge 4 while being folded back again inwardly so that when the dihedron 2 of one of the female legs is inserted on the corresponding male member ridge 4, the edge 6 of the female leg dihedron initially rests against the extension 5. From that position, as the female member 1 is pushed strongly towards the male member 3, the female member dihedron 2 opens resiliently (in a counterclockwise movement on the right part of FIG. 1) while the male member dihedron or ridge 4 is moved inwardly under the pressure from edge 6, exerted on extension 5. At the same time, the central webs of the two members 1 and 3 are curved: the web of member 1 shows a concave surface on the outside and the web of member 3 a convex one. When the edge 6 has overlapped the ridge 4 and rests on the base of the male member dihedron, clipping or snap fitting of the two members is completed, and the resilient deformation of the webs and dihedron-shaped legs of the members 1 and 3 tends to disappear.

Nevertheless, in order to avoid play between the members 1 and 3 and to oppose relative longitudinal gliding movement between the two members (i.e., in a direction perpendicular to the plane of the drawing), the two members must be so dimensioned that a deformation or warping remains in both members, forcing ridge 4 against the back of the dihedron 2, following the direction of arrow F.

This residual force F keeps a certain concavity C in the web of the female member 1. The present invention, in the embodiment now to be described, aims at avoiding this concavity, which may be a substantial disadvantage especially in the case of thin and relatively only slightly rigid members 1.

In accordance with the present invention, in the embodiment illustrated in FIGS. 2-5, there are provided a female channel member 7 having side legs 8 each terminating in a hitching ridge 9, and a male member 10 having side legs 11 folded to form return flanges projecting inwardly and having the same role as the extension 5 in the prior art structure of FIG. 1 so that, during the assembly process, by pressure, they will push the edges 9 of legs 8 outwardly as illustrated in FIG. 3. During this operation (which can be done as well by inserting the edge 9 of one of the side legs 8 under the corresponding ridge 12 between the male member 10 and a side leg 11 and by rotating the female member around that ridge) both members 7 and 10 are resiliently deformed in the same way as in prior art structures, and the web of member 7 becomes concave (C).

After being assembled, that is to say when the edges 9 of both legs 8 have respectively passed behind the ridges 12 on the two sides of member 10, the two members 7 and 10 tend to resume their original unstressed configurations. Nevertheless, and complying with the invention, the dimension of each leg 11 between its hitching ridge 12 and its free edge 13 is such that when free and unstressed, the height h (FIG. 2) of the edge 13 in relation to the internal web surface of member 10 is slightly greater than the distance h' (FIG. 4) between the facing inner web surfaces of the assembled members 10 and 7, i.e. when edge 9 is inserted under ridge 12. As a result, after assembly, the male member legs 11 cannot return to their original position and remain under residual compression, which produces a thrust P exerted on the thin central web of member 7 and maintains engagement of edges 9 with ridges 12.

It will be appreciated that, within the scope of the invention, the exact form of the legs 8 of member 7 and the position of the hitching ridges 12 of member 10 are not limited to the specific configurations illustrated. Thus, the legs 8 could be half-circular instead of being flat and perpendicular to the thin sheet 7. Likewise, the angular configuration of the channel member legs shown in FIG. 1 could be preserved with extension 5 widened so that in the assembled structure it remains warped while still parted from the inner surface of dihedron 2 and its edge presses elastically on the inner surface of the web of member 1.

Referring now more particularly to FIG. 5, in the assembled conditions of male member 10 and female member 7, the thin central web of member 10 is only slightly convex so that it can, like the front surface of the web of member 7, bear sign characters. In this case, the assembled unit can be attached perpendicularly to a wall 14. In order to achieve that, wedges 15 are used, which ensure the jamming of the male member side legs 11 in the FIG. 4 position bearing against the web of member 7. To this end, each of the wedges includes a core 16 having a slightly pyramidal trunk and a small base plate 17. The core 16 inserts itself in the inner space 18 of the assembled structure of FIG. 4; under pressure, the base plate 17 covers the extreme edges of the members 7 and 10. The inner one of the wedges 15 is secured to the wall 14 by screws 19; alternatively or additionally, a brace (not shown) such as a threaded tie rod may be screwed in hole 20 in wedge 15 and/or in wall 14, and may extend through a hole 21 in the opposite wedge 15, bearing a nut (also not shown) at its outer end. Again, the wedges 15 may, among other possibilities, each comprise a small plate with projecting resilient clips insertable in the tubular element formed by the male and female members and resiliently engaging one of these members.

In summary, then, in the above-described embodiment of the invention a resiliently deformable front plate or female member 7 and a resiliently deformable complementary (male) member 10 are interfitted in facing parallel relation to form a rigid tubular element usable, for example, as a sign. The side legs or clipping sections 11 of the male member 10 are bent inwardly about interlocking or hitching ridges 12 disposed substantially in the plane of the central web of the unstressed male member. Each of these side legs has a length h (FIG. 2) and unstressed bending angle (relative to the central web of member 10) such that the height l (FIG. 2) of the unstressed legs 11 of member 10 above the central web of that member exceeds the corresponding dimension h' (FIG. 4) between the central webs of the two members 7 and 10 in the assembled element. Consequently, when the two members are interfitted, the free end portions of the legs 11 bear against the inner surface of the central web of member 7, while the free ends 9 of the legs 8 of member 7 engage the ridges 12 externally, with the result that both the legs 8 and the central web of member 7 are stressed in tension and undesired concavity of the outer surface of the latter web is prevented. The described interengagement of the two members also clamps them securely together against transverse separation and at the same time provides strong frictional resistance to relative longitudinal sliding movement of the two members. Wedges 15 can serve as end closures and/or mounting means for the completed assembly, and, by bearing against the legs 11 within the assembled hollow or tubular element, may also augment the desired interlocking of the members and tensioning of the web of member 7. Positive prevention of relative longitudinal movement of the members 7 and 10 may be optionally be provided by interconnecting the opposed end wedges with a tie element (not shown) extending through their respective holes 20, 21 and through the intervening central hollow space 18 of the tubular element.

Notwithstanding the strong and secure interconnection of the two members 7 and 10 in the assembled element, they may be separated manually, for example to change a sign by substituting one legend-bearing front plate for another. To do this, the exposed side legs 8 are gripped with the fingers while pressure is exerted with the thumbs (in the same direction indicated by arrow C, FIG. 3) on the outer surface of the central web of member 7, until the legs 8 diverge outwardly to clear the ridges 12. Both assembly and disassembly of the tubular element may thus be effected without requiring the aid of any tools.

While the foregoing embodiment, incorporating interfitted resiliently flexible, thin-walled members 7 and 10, exemplifies particularly important specific features of the invention, various modifications and alternative uses are possible. FIG. 6 illustrates schematically an arrangement in which the front plate or female member 7a is a thick-walled, substantially rigid member, e.g. of steel; in this case, the complementary male member 10a is relatively reduced in width (arrow m) to avoid a bulge and to obtain the desired interfitting engagement.

In FIG. 7, the female member is a boxlike member 7b of substantial depth, with legs respectively having paired, coplanar, inwardly projecting side ledges 22 and free ends 24 spaced from its central web for respectively engaging the apices and inner bends of the resiliently deformable legs 11b of the complementary member 10b. Such a structure may be employed to house a lamp, with a spring-clip bracket 26 secured to the inner web wall of the member 10b to engage a lamp bulb 28.

FIG. 8 illustrates a further modification in which a first member 30 and a second member 32 are interconnected edgewise by the clipping attachment of a female portion 7c and a male portion 10c respectively formed along their facing edges. The female portion has two parallel facing legs terminating in inwardly projecting free ends, and a pair of coplanar ledges respectively projecting inwardly from the two legs in spaced relation to the free ends of the legs to define therewith a pair of facing pockets. The male portion has a pair of coplanar transverse ledges respectively extending outwardly to a pair of ridges from which a pair of legs respectively project upwardly and inwardly so as to be receivable, respectively, within the aforementioned facing pockets of the female portion. Each of the male portion ledges is formed integrally with one of the male portion legs to constitute therewith a unitary, resiliently deformable section bent at the included ridge, and each male portion leg has an unstressed height (corresponding to dimension h in FIG. 2) slightly greater than the space available for it within the associated female portion pocket (i.e. when the male portion legs are inserted within the female portion pockets). Consequently, in the assembled device, the male portion legs bear against the female portion ledges and the free ends of the female portion legs are held in tension against the male portion ridges, securing the elements 30 and 32 together.

It will be seen that this interconnecting arrangement corresponds generally to the structure of FIG. 7, where the female member ledges 22 and free ends 24 cooperatively define pockets for receiving the male member legs 11b, although in FIG. 7 the male member ledges are integral portions of the central web of the member 10b. Also, this interconnecting arrangement corresponds to the structure of FIGS. 2–5, where the female member ledges are integral portions of the central web of the member 7 and the male member ledges are integral portions of the central web of the member 10. Owing, however, to the discontinuity of the female member (or female portion) ledges in the structures of FIGS. 7 and 8, the latter lack the special female member web-tensioning coaction of the members which is an important feature of the invention as exemplified by the embodiment of FIGS. 2–5.

In FIG. 9, the female member 7d has a longitudinal 90° salient bend 34 at the middle of its central web, and the male member 10d has a corresponding central longitudinal 90° reentrant bend 36, to provide a hollow angular element mountable, for example, on a corner 40 of a building. As suggested by broken line 42 in FIG. 9, the female member could alternatively be formed with a convexly arcuate external profile.

FIG. 10 shows a structure for interconnecting two elements such as pipes, sheaths, or conduits 44, 46, which may be of square, circular or other cross-sectional configuration. The female member 7e and male member 10e are respectively disposed in surrounding relation to the two pipes, with gaskets 48, 50 respectively provided between these members and the pipes, and are interconnected by joining movement in the directions indicated by arrows 52 and 54.

In the device of FIG. 11, the male member 10f has transverse outwardly open grooves 56 formed therein, and the female member 7f has corresponding notches 58 cut in its side legs for register with the grooves 56, to accommodate pins (not shown) or like connectors e.g. to arrest the members against horizontal translatory movement. In FIG. 12, pins 60 are formed on the male member 10g (with which the female member 7g interfits) to arrest both horizontal and vertical translatory movement. FIG. 13 shows an element wherein the female member 7h and male member 10h both have notches 62 or holes 64 formed in their side flanges, for example to enable mounting on a metallic net (wire) structure 66. In FIG. 14, the male member 10i (received within female member 7i) is formed with a transverse stiffener 68 extending in the direction of arrow s.

The male member 10j in FIG. 15 may be generally similar to the member 10 of FIGS. 2-5 (and may interfit with the female member 7 of those figures) but has holes 70 formed in its side flanges 11j adjacent its ends for receiving pins or lugs 72 carried on projections 74 of an end plug 15'. In FIG. 16, the assembly of the female member 7 and male member 10 of FIGS. 2-5 is modified by interposition of gaskets 76 between the ends 9 of legs 8 and the ridges 12 to contribute to the tightness of the assembly.

Referring next to the embodiment of FIGS. 17-19, plural parallel male members 10k are formed side-by-side on a common carrier rail 78. These members 10k may be individually engaged by parallel female members 7k (FIGS. 17, 18, 19), or alternatively, for example, the outer legs of two adjacent members 10k may be engaged by a single broad female member 7l (FIG. 19) spanning both of the adjacent members 10k. If individual female members 7k are used, the space between them may be occupied (e.g. for aesthetic purposes) by a filler member 80 (FIG. 18) having longitudinal edge flanges trapped between the legs of the adjacent members 10k. The embodiments of FIGS. 17-19 have particular utility, for example, as signs, ceilings, wall decorations, etc.

FIG. 20 illustrates a modification of the embodiment of FIG. 7 incorporating an end plug or ferrule 15'' generally similar to the plug 15' of FIG. 15 but appropriately dimensioned to close the entire end of member 7b. Thus, plug 15'' has projections 74' bearing pins 72' which are received in holes 70' formed in the side flanges of male member 10m, which is otherwise identical to member 10b of FIG. 7.

In FIG. 21, a male member 10n is secured to an end plug 15''' for engagement with an end portion of a female member 7n. Similarly, in FIG. 22, an end plug 115 bears a plate 116 on which are provided parallel male members 10p for individual engagement with side-by-side female members 7p or for engagement with a single, broad female member 7q spanning both members 10p.

Elements such as those shown in one or more of FIGS. 2-5 and 6-22 have application for diverse structural, functional and decorative purposes, including, without limitation, use as or in signs and the like (as already described); illuminated signs; wall decoration with integrated accessories (e.g. insulation); ornamental ceilings; ornamental objects such as mirrors with non-visible attachment; office furniture, viz. to attach different elements of a table, a drawer, etc.; stair hand rails; sun visors or folding screens; attachment of decorative elements (e.g. different-colored side panels) or functional elements in automobiles; lamps (attachment of shades and/or back reflectors); building trim such as angle covers; building wall panels; metal garage or home doors incorporating stiffeners or multiple attachment means; decorating materials for assembly and installation in homes or shops; linen stretching devices; exhibition stands for fairs and the like; and supermarket display devices.

It is to be understood that the invention is not limited to the features and embodiments hereinabove specifically set forth but may be carried out in other ways without departure from its spirit.

I claim:

1. A structure comprising a resiliently flexible plate member (7) having a projecting border section (8,9) along at least a part of its periphery, and a complementary member (10) bearing a complementary resiliently deformable relief section (11) over which said border section (8,9) is fittable in clipping attachment by resilient deformation of at least a portion of at least one of said members, said border section having an edge (9) and said complementary member being formed with a hitching ridge (12) over which the edge (9) of said border section seats and from which said relief section (11) extends, wherein the improvement comprises said relief section being dimensioned and in unstressed condition being angularly oriented such that the height (h) in unstressed condition of the relief section (11) beyond said ridge (12) is greater than the distance (h') between said ridge (12) and the plate member (7) in the assembled structure, such that, in the assembled structure, the relief section (11) bears against the plate member (7) and is urged inwardly thereby.

2. A structure as defined in claim 1, wherein said relief section includes at least two opposed inwardly bent legs, and further including a wedge (15), opposed to inward deformation of the relief section (11) in the assembled structure, said wedge being interposed between at least portions of said two opposed legs.

3. A structure as defined in claim 2, wherein said wedge (15) includes a core (16) projecting between said two legs and, on the external end of said core, a peripheral edge (17) which cooperates with an end edge of the front plate member (7) to form a cover.

4. A structure as defined in claim 1, wherein said members cooperatively define a tubular element, and further including a wedge (15') comprising a small plate covering the extremities of the plate member (7) and of the complementary member (10) and two elastic clips which project into the interior of the tubular element and are interengaged by clipping with at least one of said members.

5. A structure as defined in claim 2, further comprising a second wedge, the first-mentioned wedge and the second wedge being respectively disposed at opposite ends of said structure and interconnected by a brace.

6. A structure as defined in claim 1, wherein said complementary member (11) is mounted on a support.

7. A structure as defined in claim 6, wherein said support comprises a flat surface to which said complementary member is secured.

8. A structure as defined in claim 6, wherein said support comprises vertical, horizontal or oblique railings hinged at their meeting points or following a single direction, while interdependent with the complementary elements in a revolving way.

9. A structure as defined in claim 6, including two of said complementary members (10) fixed back to back on the same support.

10. A structure as defined in claim 2, wherein said wedge secures the structure to a support (14).

11. A structure as defined in claim 1, wherein said border section is wide, and wherein at least one of said members has a central part which is made more rigid than the parts of the same member adjacent the border sections.

12. A structure as defined in claim 1, wherein said complementary member defines a channel, and including a stiffener element introduced into said channel.

13. A structure of interfitted members comprising a resiliently deformable female channel member having a central web and opposed side legs with free ends bent inwardly toward each other, and a resiliently deformable male channel member having a central web and opposed side legs bent inwardly toward each other from ridges respectively formed along opposite side margins of the central web of the male member, said female and male members being disposed in facing parallel relation to cooperatively constitute a tubular element with the legs of the female member fitted over the legs of the male member and the bent free ends of the female member legs respectively engaging said ridges, and said male member legs in unstressed condition having a height greater than the distance between the male and female member webs in the assembled structure such that the male member legs bear against the female member web for stressing the female member web in tension.

14. A structure as defined in claim 13, further including a wedge inserted between the male member legs at least at one end of the tubular element for urging the male member legs apart.

15. A structure as defined in claim 14, wherein said wedge comprises means for mounting the tubular element on a support.

16. A structure as defined in claim 13, wherein said male member comprises means for mounting the tubular element on a support.

17. A structure comprising an interfitted assembly of a male member and a female member in which the male member is received and secured, said female member including a pair of spaced legs having inwardly bent free ends and a pair of ledges respectively projecting inwardly from the legs in spaced relation to the free ends to define therewith a pair of pockets, said male member including a pair of ridges respectively engageable outwardly by said free ends and a pair of resiliently deformable legs formed integrally with and projecting forwardly and bent inwardly from the ridges for insertion, respectively, into said pockets, said male member legs having a height in unstressed condition such that, in the assembled structure, the male member legs bear against and are compressed inwardly by said ledges.

18. Structure as defined in claim 17, wherein said male member is an integral channel member having a central web and said ridges are respectively formed along opposite sides of the web.

19. Structure as defined in claim 18, wherein said female member is an integral channel member having central web and said ledges are, respectively, opposite side portions of the female member web.

* * * * *